United States Patent [19]

Ian et al.

[11] 3,794,408

[45] Feb. 26, 1974

[54] OPTICAL FILTER

[75] Inventors: Sing Liong Ian; Jan August Marcel Hofman; Gijsbentus Bouwhuis, all of Emmasingel, Eindhoven, Netherlands

[73] Assignee: U.S. Philips Corporation, New York, N.Y.

[22] Filed: Aug. 14, 1972

[21] Appl. No.: 280,083

[30] Foreign Application Priority Data

Aug. 14, 1971 Netherlands ....................... 7111227

[52] U.S. Cl...... 350/162 R, 178/5.4 ST, 350/162 SF

[51] Int. Cl. ............................................. G02b 5/18

[58] Field of Search 178/5.4 ST; 350/162 R, 162 SF, 350/162 ZP

[56] References Cited

UNITED STATES PATENTS

| | | | |
|---|---|---|---|
| 3,566,017 | 2/1971 | Macovski | 178/5.4 |
| 3,681,519 | 8/1972 | Larsen et al. | 178/5.4 |
| 3,715,473 | 2/1973 | Tan | 178/5.4 |
| 3,563,629 | 2/1971 | Beyer et al. | 350/162 X |

*Primary Examiner*—William F. Lindquist
*Attorney, Agent, or Firm*—Frank R. Trifari

[57] ABSTRACT

An optical filter for use in a field-sequential colour television camera, for which purpose it is rotatably arranged in front of a light-integrating camera tube. The filter partly comprises sections which produce a reduction in definition and for this purpose are provided with a plurality of diffraction gratings having different spacings. The optical filter which owing to the provision of the diffraction gratings has a discontinuous light transmission characteristic, after integration of the light has a more or less continuous light transmission characteristic which corresponds in a desirable manner to an electric filter characteristic.

12 Claims, 5 Drawing Figures

OPTICAL FILTER

Figure 1:
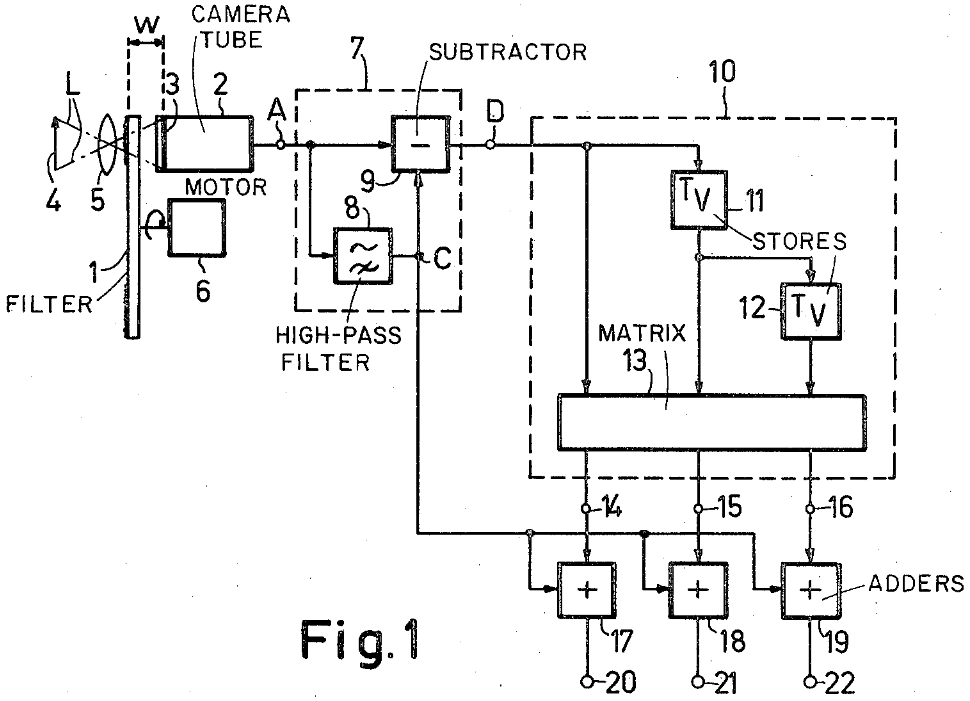

The invention relates to an optical filter suitable for use in an opto-electronic converter, the filter producing a reduction in definition in an image of a scene to be picked up which is to be projected on to the converter.

Such an optical filter is described in our copending U.S. Pat. application No. 126,693, filed Mar. 22, 1971 and now U.S. Pat. No. 3,715,473. The opto-electronic converter described in this application and corresponding patent takes the form of a color television camera which comprises a single camera tube which produces picture signals in a field-sequential manner. The picture signals are applied to a field-sequential simultaneous electronic converter provided with a storage device.

The said application describes two steps to be taken to enable an inexpensive store having a restricted frequency range to be used in the electronic converter, which in displaying a scene a picture is obtained which is rich in detail and is made up of different bright (saturated)colors. The first step is to optically influence the light emanating from the scene and hence the image of the scene projected onto the camera tube. In the second step the picture signals produced by the camera tube are electronically processed before being applied to the electronic converter.

To perform optical processing the optical filter, which takes the form of a rotatable color filter, is made up of sectors which each are subdivided in sector portions. Sectors are described which each comprise a portion which transmits the light from the scene without change in definition and without color filter effect and a portion which reduces definition and may include a color filter. A sector is rotated at a rate such as to pass in front of the camera tube during a field period. The camera tube, which picks up the scene by integrating the light from the scene overthe field period, thus delivers in a field period a composite picture signal which owing to the optical processing with the introduced lack of definition is made up of two signal components, i.e., a signalwhich is restricted in frequency by the reduction in definition and a signal which is not influenced and hence is not restricted in frequency.

The composite picture signal obtained by means of the optical processing is further processed by electronic means; it is applied to an aperture correction signal generator which substantially in known manner derives a horizontal aperture correction signal from the uninfluenced signal component of the picture signal. The aperture correction signal then is so added to the composite picture signal as to restrict the composite picture signal in frequency. The frequency-restricted composite picture signal is applied to the store in the electronic converter which delivers frequency-restricted simultaneous picture signals. The aperture correction signal, which is and remains field-sequential, is superposed on the frequency-restricted simultaneous picture signals to achieve horizontal aperture correction.

The optical and electronic frequency restriction enables a simple and inexpensive store to be used in the field-sequential simultaneous electronic converter, while in display a picture of the scene which is rich in detail and is made up of different saturated colors is obtainable.

The purpose of the optical frequency restriction is to achieve a frequency separation in the picture signal generated by the camera tube such that the aperture correction signal generator, which causes the electronic frequency restriction, mainly is operative only in the higher-frequency picture signal component of the composite picture signal. In both cases the frequency restriction corresponds to a given transmission characteristic of an electrical filter. Owing to the highly different foundations (optical and electronic) on which the frequency restrictions are based, the said filter characteristics also may be widely different. For example, from the electronic point of view a continuously varying filter characteristic is desirable, and such a characteristic is optically obtainable by means of a ground-glass optical filter, but these characteristics may have different forms. A given desirable form may readily be obtained by electronic means, but this is not the case at all with an optical filter, in particular a ground-glass filter. The ground-glass optical filter produces an omnidirectional light diffusion, whereas in the camera described only the light diffusion for the line scan or horizontal direction is significant in connection with the high frequencies. The use of a diffraction grating as the optical filter enables a reduction in definition in a single direction to be obtained, however, the equivalent filter characteristic is discontinuous and completely different from the desired continuously varying electric filter characteristic.

It is an object of the invention to provide an optical filter which in a simple and exact manner may be given any desired filter characteristic and which is characterized in that the filter, which comprises sectors, is in the form of a diffraction grating filter, a sector which causes the reduction in definition comprising a plurality of diffraction gratings having different spacings.

The invention is based on the recognition that a diffraction grating filter with its inherent discontinuous filter characteristic may be used, because the gratings, which have different spacings and hence filter characteristics in each of which the discontinuities are differently located, together provide a more or less continuously varying filter characteristic owing to the addition in time which takes place in the converter.

Figure 2:
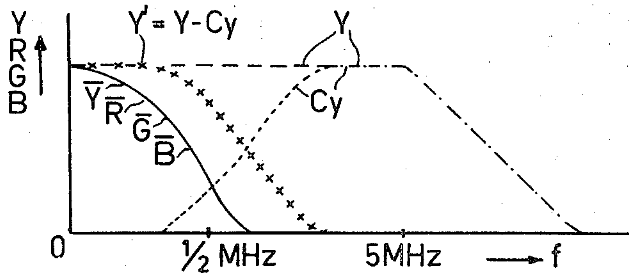
Figure 3:
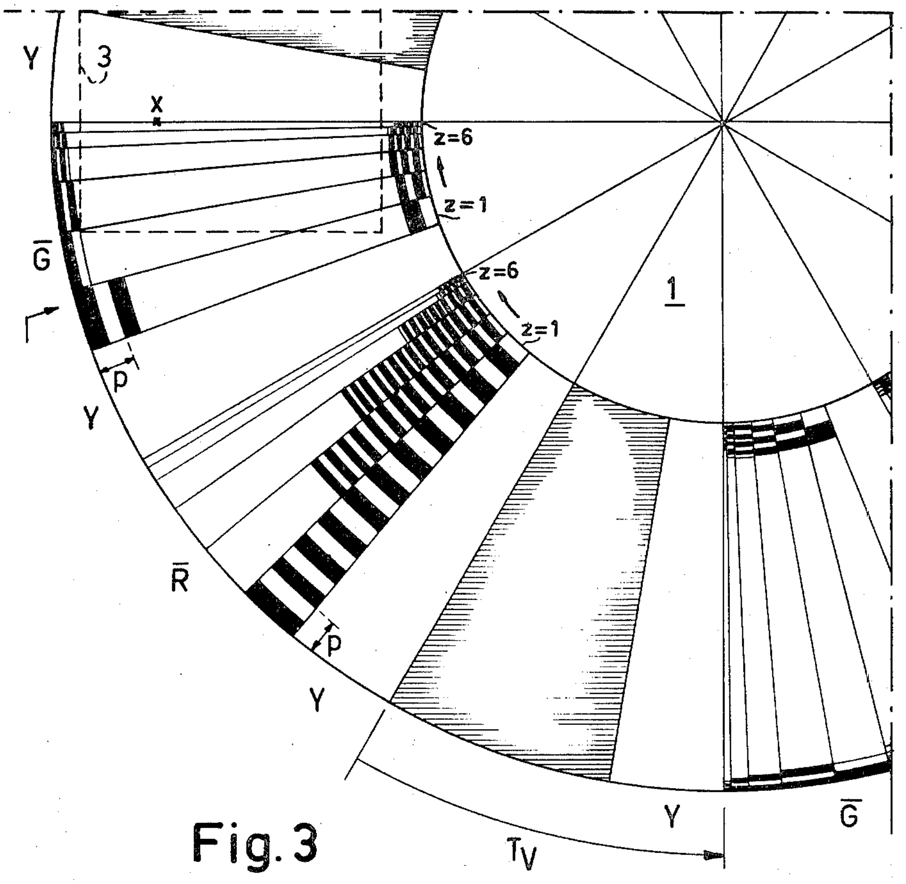
Figure 4:
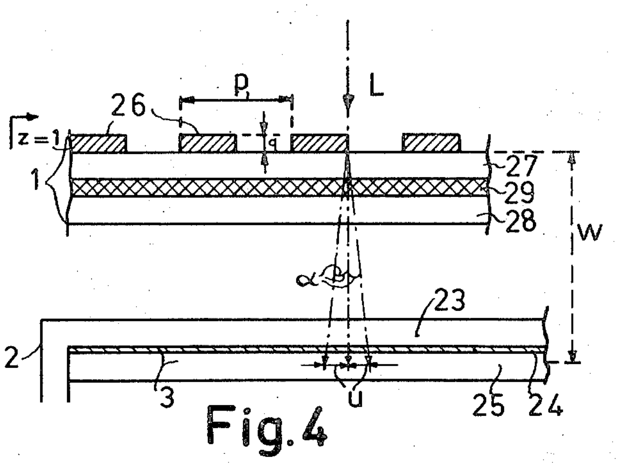
Figure 5:
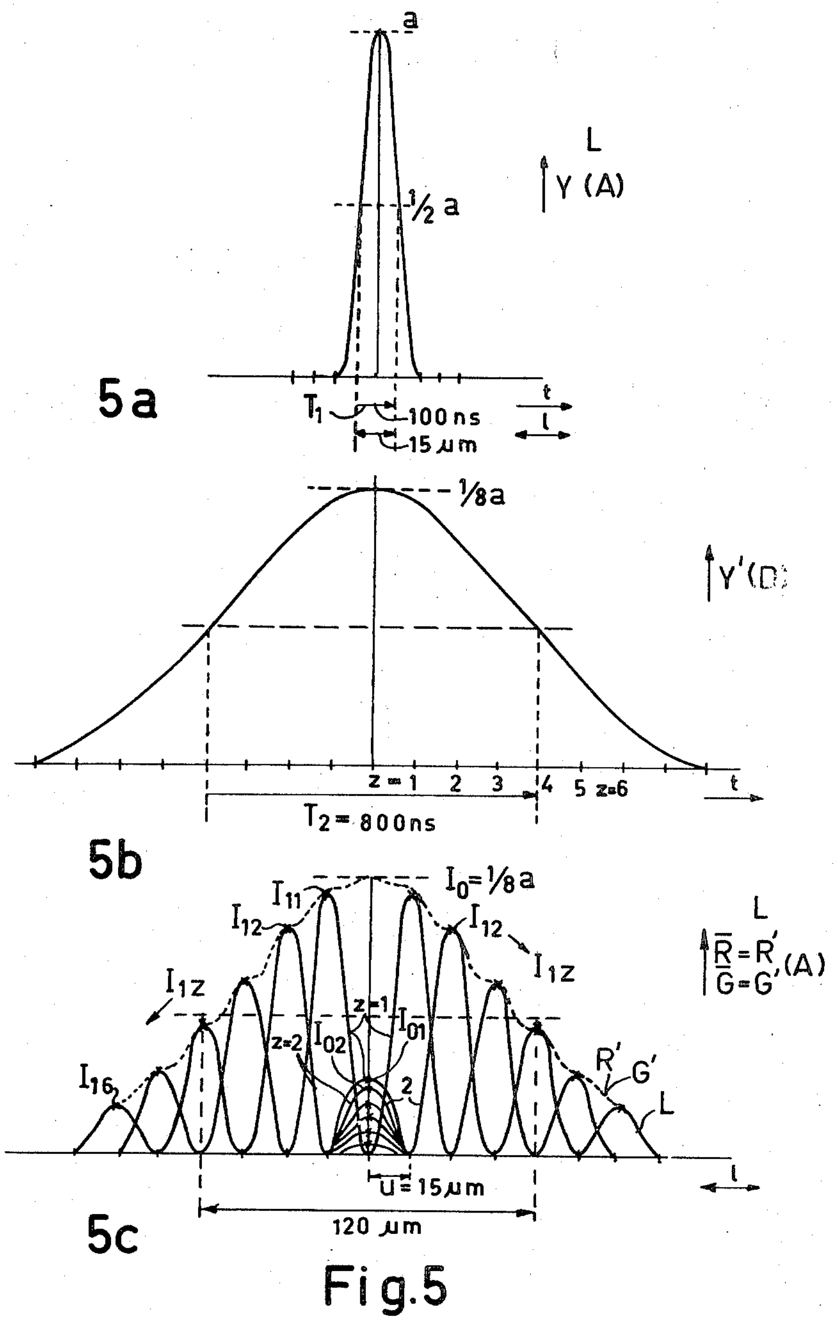

An embodiment of the invention will now be described, by way of example, with reference to the accompanying diagrammatic drawings, in which:

FIG. 1 is a block diagram of an opto-electronic converter in the form of a color television camera suitable for use with an optical filter according to the invention, FIG. 2 shows signal amplitude/frequency characteristics produced by electric and optical filters, FIG. 3 shows in detail part of an optical filter according to the invention, FIG. 4 is a part sectional view which illustrates the relationship between FIGS. 1 and 3, and FIG. 5 shows some diagrams of time and place which illustrate the invention.

Referring now to FIG. 1, there is shown an opto-electronic converter in the form of a color television camera in which an optical filter 1 according to the invention may be used. The color television camera shown in FIG. 1 is des-cribed in detail in U.S. Pat. 3,715,473.

The camera shown in FIG. 1 includes a camera tube 2 having a target 3. In the camera tube 2, which may be of the vidicon type, an electron beam is produced and deflected by means (not shown) which scan the target 3 according to lines and fields. Light L from a scene 4 is projected on the target 3 via an objective 5 and optical filter 1 which is rotated by a motor 6. Under the influence of the rotating filter 1 the pick-up tube 2 produces a field-sequential picture signal at a terminal A, i.e., during a field period a picture signal in a color determined by the filter 1 is produced, the entire color information of the scene 4 being given in a cycle of, say, three fields. The picture signal which is field-sequentially produced by the camera tube 2 must be converted to enable it to be displayed on a standard receiver using simultaneous signals. For this purpose the terminal A is connected via a circuit 7 which comprises a high-pass filter 8 and a subtraction stage 9 to a terminal D which in turn is connected to a field-sequential-to-simultaneous electronic converter 10. The circuit 7 is provided to introduce a frequency restriction in the picture signal which appears at the terminal A. For this purpose the electric filter 8 derives a high-frequency signal component C from the picture signal at the terminal A, which component is subtracted from the picture signal by the subtraction stage 9. At the terminal D a frequency-restricted picture signal is available for processing in the electronic converter 10.

The converter 10 comprises two stores 11 and 12 and a linear matrix circuit 13 which is siwtched at the field frequency. The terminal D is connected directly to one input of the matrix circuit, through the store 11 to a second input and through the series combination of the two stores 11 and 12 to a third input. The stores 11 and 12 delay the picture signal from the terminal D by a field period $T_V$ each and may be simple and inexpensive, because the applied picture signal has a restricted frequency range. The matrix circuit 13 receives by means of the stores 11 and 12 three simultaneous signals associated with the colors which are field-sequentially transmitted by the optical filter 1 in a cycle of three fields. During the three-field cycle there is applied to each of the inputs of the matrix circuit 13 a different picture signal which occurs during a field period, In order to ensure that at each of three output terminals 14, 15 and 16 of the matrix circuit 13 always the same picture singal corresponding to a given color is produced the circuit 13 must include three switches which switch at the field frequency. If at the terminals 14, 15 and 16 picture signals are to be produced which correspond to the primary colors red (R), green (G) and blu (B), which colors are not separately but jointly transmitted by the optical filter 1, during the field periods the matrix circuit 13 must further include a network of superposition stages which enable the primary color signals to be derived from the combined signals by subtraction and addition.

The output terminals 14, 15 and 16 are each connected to one input of an addition stage 17, 18 and 19 respectively the second inputs of which are connected to the output of the high-pass filter 8 in the circuit 7 at which the signal C appears. As a result, the addition stages 17, 18 and 19 at their output terminals 20, 21 and 22 respectively deliver signals which each comprise a frequency-restricted simultaneous signal component provided by the converter 10 and a high-frequency field-sequential signal component provided by the circuit 7. Displaying the signals which appear at the output terminals 20, 21 and 22 by means of a standard receiver results in a sufficiently well defined and faithful image of the scene 4, although the converter 10 is only capable of producing signals which when displayed produce an image which is poor in detail and in definition. The above is set out more fully in the aforementioned Patent application.

A difference from the arrangement described in the said Patent is that the horizontal aperture correction signal generator which provides the signal C in the arrangement described in the said application is replaced in the arrangement according to the present application by the high pass filter 8; however, the use of a filter which for simplicity is employed in the present application was referred to in the former application already. In both cases a signal processing operation is performed between the terminals A and D which corresponds to a given electric filter characteristic.

The said Application describes that when the scene 4 contains a plurality of more or less saturated colors the optical filter 1 is to be made up of sectors which transmit the light L partly with reduced definition and partly with unreduced definition. Using an $R$, $G$, $B$ notation for the color signals and the filter sectors and a notation $Y = R + G + B$ for the luminance signal and denoting an optical reduction in definition by a dash over the respective symbol, a filter 1 comprises four groups which each consist of three sectors which form a cycle, i.e., $Y$; $Y$, $\overline{R}$; and $Y$, $\overline{G}$. This is shown in FIG. 3 which shows part of the optical filter 1. Durng each field period $T_V$ one of the said sectors rotates past the camera tube 2 provided with the target 3. Thus, during a cycle of three field periods there are produced at the terminal A of FIG. 1 the signals $Y$; $Y + \overline{R}$; and $Y + \overline{G}$.

The said Patent gives a number of signal amplitude/-frequency characteristics, which are again shown in FIG. 2 to explain the significance of the present Application.

It will be seen that the high-pass filter 8 derives substantially no signal from the signals $\overline{R}$ and $\overline{G}$ which are optically restricted in frequency, so that only a high-frequency signal $C = C_Y$ is produced. Using an accent notation, the result of the electrically performed frequency restriction is $Y' = Y - C_Y$. Thus, during the cycle of three field periods there appear at the terminal D the signals $Y'$; $Y' + \overline{R}$; and $Y' + \overline{G}$. The matrix circuit 13 to which these signals are simultaneously applied performs the following superpositions:

$$(Y' + \overline{R}) - Y' = \overline{R} \qquad 1$$

$$(Y' + \overline{G}) - Y' = \overline{G} \qquad 2$$

Addition of 1 and 2 gives $(\overline{R} + \overline{G})$, and combination with $Y'$ gives:

$Y' - (\overline{R} + \overline{G}) = Y' - (\overline{Y} - \overline{B}) = \overline{B} + Y' - \overline{Y}$, because $\overline{Y} = \overline{R} + \overline{G} + \overline{B}$.

Thus there appear at the output terminals 20, 21 and 22 the following signals:

$\overline{R} + C_Y$; $\overline{G} + C_Y$; and $\overline{B} + (Y' - \overline{Y}) + C_Y$.

FIG. 2 shows that the signals $\overline{R} + C_Y$ and $\overline{G} + C_Y$, in contradistinction to the signal $Y$, have no flat amplitude frequency characteristics, whereas the signal $\overline{B} + Y' - \overline{Y} + C_Y$ does have such a characteristic. The reason for this is the difference between the frequency characteristics of the signal $Y'$ produced electrically by means of the signal $C_Y$ and of the signal $\overline{Y}$ produced optically by means of the signals $\overline{R}$ and $\overline{G}$. If for the frequency characteristics of FIG. 2 we should have $\overline{Y}=\overline{R}=\overline{G}=\overline{B}=Y'(=R'=G'=B')$, the signals at the output terminals 20, 21 and 22 would have flat amplitude-frequency characteristics.

As will be described in detail hereinafter, FIG. 3 shows an optical filter 1 which enables the optical filter characteristics for the signals $\overline{R}$ and $\overline{G}$ to be made substantially equal to any desired electric filter characteristic for the signal $Y'$, so that the aforementioned purpose is attained.

FIG. 4 shows part of the optical filter 1 in relation to the camera tube 2 including the target 3. The camera tube 2 is symbolically indicated by a glass face plate 23 which is internally coated with a transparent electrically conductive layer 24 which in turn is coated by a semiconductor layer 25. The layer 24, which is the signal plate, is connected in a manner, not shown, via a resistor to an external voltage source. According to the local illumination of the semiconductor layer 25 by the light L a resulting photo-leakage current produces a potential image on the target 3 which comprises the layers 24 and 25. Scanning the target 3 by an electron beam produces across the said resistor associated with the signal plate (24) a voltage drop due to local neutralization of the potential image. The aforementioned picture signals are obtained by connecting the junction of the signal plate (24) and the resistor via a capacitor to the terminal A of FIG. 1.

Before the optical filter 1 will further be described, the requirements to be satisfied by the filter characteristics will be discussed. FIG. 5 shows curves or diagrams as functions of time $t$ and/or location 1. The diagrams of FIG. 5 represent, according to the approach, various quantities which show more or less the same variation as a function of location or time. Thus, the diagram of FIG. 5*a* as a function of location 1 corresponds to a potential image on the target 3 produced by the light L. By means of electron beam scanning, which is assumed to be ideal, in the camera tube 2 the potential image is converted to an electric signal which is plotted as a function of time $t$ so as to give the same curve. Hence, the diagram of FIG. 5*a* also corresponds to a signal $Y$ at the terminal A.

FIG. 2 shows that it is desirable for the signal $Y$ to be utilized in the pickup-display system up to a frequency of 5 MHz. This is associated with a signal period of 200 ns so that, starting from a signal which changes according to a square-wave function, the pulses in either direction have a duration of 100 ns. Owing to the finite frequency range such a pulse signal cannot have infinitely steep edges. FIG. 5*a* shows such a single pulse signal $Y$(A) having an amplitude of $a$, the time 100 ns being related to the value one-half$a$; this time is generally referred to as the half amplitude time.

The camera tube 2 produces the described signal $Y$(A) of FIG. 5*a*. If the scene 4 contains a spot of bright light this is imaged via the objective 5 on the target 3 and converted into a local potential increase by the layer 25 (FIG. 4). Owing to the fact that the image formation by the objective 5 is not ideal and that charge leaks away from the potential image on the layer 25, the said potential increase does not correspond to a light spot but to a wider light patch. The potential image is then scanned by the electron beam in the camera tube 2 and owing to, amongst other factors, the finite diameter of the beam a picture signal is produced which when displayed gives an even wider spread light patch. This (optical blurring which causes a light dot at pick-up to become a light patch at display corresponds electrically to the restrictedness of the frequency range of the pickup-display system. This shows that it is possible to determine how the half amplitude time of 100 ns, designated by $T_1$, of the signal Y(A) corresponds to a given distance on the target 3. Assuming a line scanning period of 54 $\mu$s and a line length of 8.1 mm on the target 3 of a miniaturised camera tube 2, the scanning velocity of the electron beam in the camera tube 2 is equal to (8.1/54 (um/ns) = 0.15 ($\mu$m/ns). This means that the signal half amplitude time $T_1 = 100$ ns corresponds to a distance of 15 $\mu$m on the target 3.

The signal $Y$(A) of FIG. 5*a* which is generated with a frequency range up to 5 MHz is processed in the circuit 7 of FIG. 1, the filter 8 and the subtraction stage 9 producing the signal $Y' = Y - C_Y$ at the terminal $D$. In FIG. 5*b* the signal $Y'$(D) is plotted as a function of time $t$ for a given design of the filter 8.

The electric filter 8 is in the form of a Gaussian filter, and by the cooperation of this filter with the subtraction stage 9 the circuit 7 has a filter characteristic which corresponds to the well-known Gaussian curve. For a detailed description of such filters we refer to "Handbook of Filter Synthesis" by A.J. Zverev, published by J. Whiley and Sons, in particular to pages 70–71 and 384–385. In general this means that when the signal shown in FIG. 5*a* having an amplitude $a$ and a half amplitude time $T_1$ is applied to the circuit 7, a loss-free filter characteristic is obtained which is identical in shape to the signal shown, but has a half amplitude time $T_0$ and an amplitude proportional to $(1,/T_0)$, and at the output of the circuit 7 a signal appears having a half amplitude time $T_2=\sqrt{T_1^2+T_0^2}$ and an amplitude $(T_1/T_2)a$.

From the aforementioned pages 384 and 70 the following relationship may be obtained for the half amplitude time $T_0$:

$$T_0 = 8\ (Ln2)^2\ (0.588/2\pi f_{3dB}) \quad (3)$$

where $f_{3dB}$ is the known frequency with an attenuation of 3 dB. From (3) there follows after calculation:

$$T_0 = (0.359/f_{3dB}) \quad (4)$$

Starting from a frequency $f_{3dB} = 450$ kHz required in the signal Y', there follows from (4):

$$T_0 = (0.359/f_{3dB}) = 796 \text{ ns}$$

The half amplitude time $T_1 = 100$ ns of the input signal $Y$ results in a half amplitude time $T_2$ of the output signal $Y'$:

$$T_2 = \sqrt{T_1^2 + T_0^2} = 800 \text{ ns}$$

while the amplitude of the output signal Y' is equal to $(T_1/T_2)\ a = 1/8\ a$. This signal is shown in FIG. 5*b* as the signal $Y'(D)$.

A comparison of the signal curves shown in FIGS. 5*a* and 5*b* shows that the circuit 7 converts the 5 MHz input signal $Y$ having an amplitude $a$ and a half amplitude time of 100 ns into a 450 kHz output signal $Y'$ having an amplitude one-eighth $a$ and a half amplitude time of 800 ns. To achieve a similar conversion by optical means instead of by electric means the potential increase on the target 3 having a peak value $a$ and a half amplitude width of 15 $\mu$m shown in FIG. 5$a$ via an optically introduced lack of definition is to be converted into a potential increase having a peak value of one-eighth $a$ and a half amplitude width of $(800/100) \times 15 = 120$ $\mu$m (FIG. 5$b$). It has been found that the lack of definition to be optically introduced must have a specific variation to permit matching to the desired electrically performed smoothing. According to the invention an accurately determined optical decrease of definition can be introduced by means of the optical filter 1 shown in FIG. 3 which will be described with reference to FIGS. 4 and 5$c$.

FIG. 3 shows about one quarter of a circular disc which forms the optical filter 1. The disc of the filter 1 comprises four groups each consisting of three equal sectors of a circle, each group being designated by $Y$; $Y$, $\overline{R}$; and $Y$, $\overline{G}$. Each sector is subdivided into two unequal sub-sectors. Each sector of the group contains a portion which is designated by $Y$ and which transmits the light L from the scene 4 (FIG. 1) without appreciably influencing it. Two sectors $\overline{R}$ and $\overline{G}$ of the group each have a portion in which diffraction gratings are diagrammatically shown, the remainder, which is equal in area, being opaque. Instead of the opaque portion the entire sector $Y$ might be provided with a neutral density filter. However, the design chosen is cheaper and simpler, because dimensional tolerances in the opaque portion can be more readily controlled than light-transmission tolerances in the neutral density filter.

The sectors $\overline{R}$ and $\overline{G}$ each comprise six diffraction gratings $z=1, \ldots, 6$ which all have different spacings in the radial direction. In the gratings $z=1$ which have the longest spacing this is designated by $p$. The spacings of the six gratings are in the ratio 1 : 1/2 : 1/3 : 1/4 : 1/5 : 1/6. During each field period $T_V$ a sector of a group rotates past the target 3. A point X is indicated on the target 3 and it is assumed that the area of incidence of the electron beam on the target 3 is slightly to the right of the point X and that the lines are scanned in a direction from right to left. During the field period $T_V$ in which the sector $Y$, $\overline{G}$ rotates past the point X this point X first receives the light L from the scene unimpeded through the sector $Y$, and subsequently the diffraction gratings $z$ of the sector $\overline{G}$ successively pass in front of this point, so that the light it receives is influenced by the gratings. The light received during the field period $T_V$ is integrated in the target 3 via the photosensitive charge leakage and built up to a given local potential. When the electron beam is incident on the point X the charge in this point is neutralized, the integration of light starting anew in the next sector $Y$. It is found that the direction of the grating spacing substantially coincides with the line scan direction, and this will prove to be advantageous.

Before the influence of the six diffraction gratings $z$ in each of the sectors $\overline{R}$ and $\overline{G}$ will be described, the operation of the diffraction gratings $z=1$ having the largest spacing $p$ will be described with reference to FIG. 4.

FIG. 4 shows an optical filter 1 provided with a diffraction grating 26 which is a phase grating shown in cross section and comprising strips of $SiO_2$ or silicon glass arranged on a base in the form of a glass plate 27. The depth of the strips of silicon galss is designated by $q$. A color filter layer 29 is sandwiched between the glass plate 27 and another glass plate 28. In the case indicated by a broken arrow in FIG. 3 the layer 29 transmits green light only. If FIG. 4 should refer to the segment $\overline{R}$ of FIG. 3, red light only would be transmitted. The layer 29 is a color filter which, however, need not form part of the optical filter 1, but may be disposed in front or at the rear of the filter so as to rotate with it in the path of the light L.

Although the diffraction grating 26 is referred to as a phase grating, a black-and-white grating may also be used, however, this has the disadvantage that one half of the incident light L is not transmitted.

It is known that the diffraction grating 26 does not transmit the incident light L unaffected in a straight line but deflects it in given directions, the general relation being:

$$\sin\alpha_n = (n \cdot \lambda / p) \tag{5}$$

where $n = 0, 1, 2,$ and so on, and $\lambda$ is the wavelength of the light. In FIG. 4 the angle $\alpha$ is shown for $n = 1$. Since it will be seen hereinafter that only $n = 0$ (rectilinearly propagating light) and $n = 1$, i.e., the zero-order and first-order components of the diffraction, are taken into account, FIG. 4 is described for the first-order component only.

For a small value of the angle $\alpha$ there follows from (5):

$$\sin \alpha = \alpha = \lambda / p \tag{6}$$

and from FIG. 4 there follows:

$$\tan \alpha = \alpha = u / w \tag{7}$$

where $u$ is the value of the first-order diffraction at a distance $w$ from the grid 26.

From (6) and (7) it follows:

$$u = (\lambda / p)\, w \tag{8}$$

Because the light L is not monochromatic but has a range of wavelengths, a mean wavelength $\lambda$ must be used in computing. Furthermore the light L passes through glass and air, so that the optical distance is equal to the real distance $w$ with a correction for the index of refraction of glass, which here is 1.5.

Starting from a wavelength of 0.54 $\mu$m for green light and of 0.62 $\mu$m for orange-red light, the mean wavelength $\lambda$ is 0.58 $\mu$m.

Starting from a negligible depth of the grating 26 and the layer 29 for the deflection distance $u$, from a thickness of 1 mm of the glass layers 27, 28 and 23 and from an air gap of 3 mm between the filter 1 and the camera tube 2, we have $w = 3 + 3/1.5 = 5$ mm.

In FIG. 5$a$ a distance 1 of 15 $\mu$m is shown and this has also been used as the deflection distance $u$, however, different values may also be used.

Introducing the above values into (8) gives:

$$p = (\lambda w/u) = (0.58/15) \cdot 5000 = 193\ \mu m.$$

It has been assumed that the spacings $p$ of the six diffraction gratings $z$ are in the ratio 1, ½, . . . , 1/6, and hence from $p_z = (193/z)\ \mu m$ it follows that $u_z = z.15\ \mu m$.

FIG. 5c illustrates the result. If the diffraction grating $z = 1$ passes in front of, for example, the point X of the target 3 of FIG. 3, the light L produces three potential increases having peak values $I_{01}$ (zero order) and $I_{11}$ (first order on either side of the zero order). The diffraction grating $z = 2$ produces zero order and first order potential increases having peak values $I_{02}$ and $I_{12}$, and for an arbitrary diffraction grating $z$ the peak values are $I_{0z}$ and $I_{1z}$.

The peak values $I_{0z}$ all occur at the same point and after addition give the value $I_0$. The peak values $I_{1z}$ are displaced by a distance $u = 15\ \mu m$, and the discontinous potential increases together have an envelope indicated by $R'$, $G'$. The envelope $R'$, $G'$ is obtained by the integration of the light performed in the target 3 of the camera tube 2 over part of the field period $T_V$.

FIG. 5c shows that starting from the given peak values $I_{0z}$ and $I_{1z}$ the envelope $R'$, $G'$ is a good approximation of the curve of FIG. 5b which represents the signal $Y'$. From this it may be concluded that at the terminal A the signals $\overline{R}$ and $\overline{G}$ appear for which $\overline{R} = R'$ and $\overline{G} = G'$. Thus the purpose of introducing an optical decrease of definition which corresponds to the curve of FIG. 5b has been achieved. Furthermore, as was desired, this decrease of definition occurs only in the horizontal or line scan direction, since the directions of the line scan and the diffraction grating spacing substantially coincide.

In the description of FIG. 5c it has been assumed that $I_{0z}$ and $I_{1z}$ have the values shown. These values are obtainable by adapting the widths of the diffraction gratings $z$ measured in the direction of rotation of the filter 1. In the embodiment of the filter 1 shown in FIG. 3 the widths decrease with increasing $z$ and hence each successive grating $z$ moves past the point X in a shorter time, so that the values of $I_{0z}$ and $I_{1z}$ have smaller values. This solution may be used both in a black-and-white diffraction grating and in a phase diffraction grating. Alternatively, each grating $z$ might be provided with a separate neutral density filter, however, the adaptation of the surface areas used in the embodiment shown is simpler and is more advantageous from the point of view of light output.

Compared with a black-and-white diffraction grating a phase diffraction grating provides the advantage that the depth of the strips may be chosen at will and may be used, for example, for determining the values of $I_{0z}$ and $I_{1z}$. In addition, the aforedescribed surface area adaptation may also be used. Hereinafter an embodiment will be described in which, without employing surface area adaptation, the strip depth of a phase grating may be used to determine the values of $I_{0z}$ and $I_{1z}$.

The curve shown in FIG. 5b corresponds satisfactorily with the known Gaussian curve. The computation of the values of $I_{1z}$ which occur in the envelope of FIG. 5c is based on the Gaussian curve. As is indicated in FIG. 5b the time axis is divided into eight parts, starting from its center, i.e., maximum amplitude, and going in both directions. Six parts are designated by $z$ = 1, 2, 3, 4, 5, 6. For the Gaussian curve we can write:

$$I_{1z} = e^{-\pi}\ (z/8)^2 \tag{9}$$

A calculation of (9) for $z$ = 1, 2, . . . , 6 gives:

$$I_{11} : I_{12} : I_{13} : I_{14} : I_{15} : I_{16} = 0.95 : 0.82 : 0.63 : 0.46 : 0.30 : 0.18 \tag{10}$$

A diffraction grating $z$ not only produces one of the first order components $I_{1z}$, but also one of the zero order components $I_{0z}$. As is shown in FIG. 5c the zero order components $I_{0z}$ are added together to give one component $I_0$. With respect to the ratios given in (10) the component $I_0$ must have the ratio 1 to satisfy the Gaussian curve. This enables the relationship between the $I_{1z}$ and $I_{0z}$ to be derived for each diffraction grating $z$. Assuming $I_{0z} = d\ I_{1z}$ for $z = 1, \ldots 6$ then: $I_0 = I_{01} + I_{02} = \ldots + I_{06} = 1$, while from (10) there follows:

$I_{11} + I_{12} = \ldots + I_{16} = 3.34$.

Both relationships can be satisfied if $d = (1/3.34) = 0.3$.

From this it follows that an an approximated Gaussian curve is obtained if for each diffraction grating:

$$I_{0z} = 0.3\ I_{1z} \tag{11}$$

When the diffraction grating 26 (FIG. 4) used is a phase grating, realizing the relationship $I_{0z} = 0.3\ I_{1z}$ for each diffraction grating $z$ is readily obtainable by a proper choice of the depth $q$ of the strips of the grating 26, for when the light L reaches the grating 26 with a plane wave front, this wave front after passing through the grating has assumed a rectangular shape having a leading front and a trailing front. The magnitude of the rectangle, i.e., the difference between the leading and trailing fronts, corresponds to a light-phase difference $\beta$ which depends upon the strip depth $q$ which is of the order of the wavelength $\lambda$ of the light L. $\beta$ can be written:

$$\beta = (q/\lambda) \cdot 2\ \pi \text{radians} \tag{12}$$

By means of a Fourier expansion of a square function with the square-wave front the light intensity ratios of the zero order components and the higher odd order components may be computed, the even order components being zero, giving:

$\cos^2 \beta/2 : (2/\pi \sin \beta/2)^2 : (2/3\pi \sin \beta/2)^2 : (2/5\pi \sin \beta/2)^2$ : and so on. From this it follows:

$$(I_{0z}/I_{1z} = [\cos^2 \beta_2/2/4\pi 2 \sin^2 \beta/2] \tag{13}$$

From (11) and (13) there follows:

$$\tan^2 \beta/2 = \pi^2/4 \cdot 10/3$$

from which follows $$\beta = 141° = 0.39 \text{ times } 2\pi \text{ radians} \tag{14}$$

From (12) and (14) there follows:

$$q = 0.39\lambda \quad (15)$$

The depth $q$ calculated in (15) is the so-called optical depth which must be corrected when calculating the real thickness of the silicon galss having a refractive index of about 1.5. Thus the real thickness $q$ of the silicon galss becomes:

$$q = 0.39\lambda/(1.5 - 1) = 0.78\lambda$$

and with $\lambda = 0.58$ $\mu$m:

$$q = 0.45\ \mu\text{m}.$$

It has been found that the use of a diffraction grating 26 in the form of a phase grating is of advantage to obtain the desired light intensity distribution owing to the freedom in choice of the depth. The use of a black-and-white grating does not provide this freedom, however, apart from the described surface area adaptation a desired envelope is obtainable by varying the spacings of the diffraction gratings.

Hereinbefore an embodiment has been described by way of example by means of which a Gaussian curve may satisfactorily be approximated to by using six diffraction gratings having different spacings. If the approximation need not satisfy such stringent requirements, a smaller number of gratings may be used. The number of diffraction gratings also depend upon the desired increase of the half amplitude width, which in FIGS. 5a and 5c has increased from 15 $\mu$m into 120 $\mu$m. If an enlargement to 50 $\mu$m is desired, three diffraction gratings may be used, the order components being spaced by 10 $\mu$m instead of by 15 $\mu$m.

What is claimed is:

1. A filter for a field-sequential color television camera, comprising a transparent disc divided into at least two groups spanning substantially equal areas, each group being further divided into at least three substantially equal sectors, at least three diffraction gratings of different spatial frequencies in equal fractional portions of at least two sectors in each group, an optically non-diffracting region in a sector of each group spanning an area equal to at least the area covered by the gratings in one of the other sectors of the group, and an optically clear sub-sector in each of the sectors containing the diffraction gratings, the optically clear sub-sectors all covering substantially equal areas of the sectors.

2. A filter as claimed in claim 1, wherein the optically non-diffracting region in the sector of each group spanning an area of at least the area covered by the gratings in one of the other sectors of the group is opaque.

3. An optical filter as claimed in claim 1, wherein the disc is divided into four groups, each containing three sectors.

4. A filter as claimed in claim 1, further comprising a different color filter in each sector of a group that contains diffraction gratings.

5. A filter as claimed in claim 1, wherein the sectors provided with diffraction gratings each comprise at least six gratings of different spatial frequencies.

6. An optical filter as claimed in claim 5, wherein the ratio between the spatial frequencies of $z$ different diffraction gratings is $1 : 1/2 : 1/3 : 1/4 : 1/z$, where $z$ is an integer at least equal to 3.

7. An optical filter as claimed in claim 1, wherein the surface areas of the different diffraction gratings in each sector are unequal.

8. An optical filter as claimed in claim 1, wherein the diffraction gratings are phase gratings.

9. A field-sequential opto-electronic converter, comprising a field sequential color television camera having an optically sensitive member, a disc rotatably mounted proximate the optically sensitive member of the camera and equally divided into at least two groups, each of said groups being equally divided into at least two sectors, at least one of said sectors comprising an optically clear sub-sector and a second sub-sector, at least three diffraction gratings in the second sub-sector, said diffraction gratings having different spatial frequencies, and means for rotating the disc at an angular velocity sufficient to sequentially pass a sector of the disc in confronting relationship with the optically sensitive member of the color TV camera during each field period of the field sequential camera.

10. A converter as claimed in claim 9, wherein the diffraction gratings in the sectors cover a fractional portion of said sectors, the remaining area in each sector containing a diffraction grating being optically clear.

11. A converter as claimed in claim 10, wherein at least one sector in each group contains an opaque area substantially equal to the area covered by the diffraction gratings in each of the other sectors of the group.

12. A converter as claimed in claim 9, wherein the diffraction gratings are phase-gratings.

* * * * *

PO-1050
(5/69)

UNITED STATES PATENT OFFICE
CERTIFICATE OF CORRECTION

Patent No. 3,794,408 Dated February 26, 1974

Inventor(s) SING LIONG TAN, JAN AUGUST MARCEL HOFMAN AND GIJSBERTUS BOUWHUIS

It is certified that error appears in the above-identified patent and that said Letters Patent are hereby corrected as shown below:

ON THE TITLE PAGE

"[75] Inventors: Sing Liong Ian; Jan August Marcel Hofman; Gijsbentus Bouwhuis, all of Emmasingel, Eindhoven, Netherlands "

should read

--[75] Inventors: Sing Liong Tan; Jan August Marcel Hofman; Gijsbertus Bouwhuis, all of Emmasingel, Eindhoven, Netherlands --;

IN THE SPECIFICATION

Col. 1, line 21, "which" first occurence should be --while--;

line 39, "overthe" should be --over the--;

line 43, "signalwhich" should be --signal which--;

Col. 3, line 4, after "and" insert --an--;

line 27 "siwtched" should be --switched--;

Col. 4, line 28, "Durng" should be --During--;

line 46, cancel "[";

PO-1050
(5/69)

UNITED STATES PATENT OFFICE
CERTIFICATE OF CORRECTION

Patent No. 3,794,408 Dated Feb. 26, 1974

Inventor(s) SING LIONG TAN, JAN AUGUST MARCEL HOFMAN and GIJSBERTUS BOUWHUIS

It is certified that error appears in the above-identified patent and that said Letters Patent are hereby corrected as shown below:

Col. 5, line 56, "one-halfa" should be --one-half a--;

Col. 6, line 4, delete "(";

line 14, "(8.1/54" should read --(8.1/54)--;

line 35, "(1/$T_O$) should read --(1/$T_O$)--;

Col. 10, line 20, "$I_{02}$=" should read --$I_{02}$+ --;

line 21, "$I_{11}$ + $I_{12}$ =" should read --$I_{11}$ + $I_{12}$+ --;

line 56, "($I_{OZ}/I_{1Z}$ = [$\cos^2$ β2/2/4π 2 $\sin^2$ β/2]"

should read

--$I_{OZ}/I_{1Z}$ = [$\cos^2$(β/2)] / [(4/π )2 $\sin^2$(β/2

Col. 11, line 9, "galss" should be --glass--;

Signed and sealed this 28th day of January 1975.

(SEAL)
Attest:

McCOY M. GIBSON JR.
Attesting Officer

C. MARSHALL DANN
Commissioner of Patents